Oct. 28, 1969     H. A. McMASTER     3,475,588
DEFROSTING AND DEICING WINDOW ASSEMBLY
Original Filed Feb. 17, 1967     2 Sheets-Sheet 1
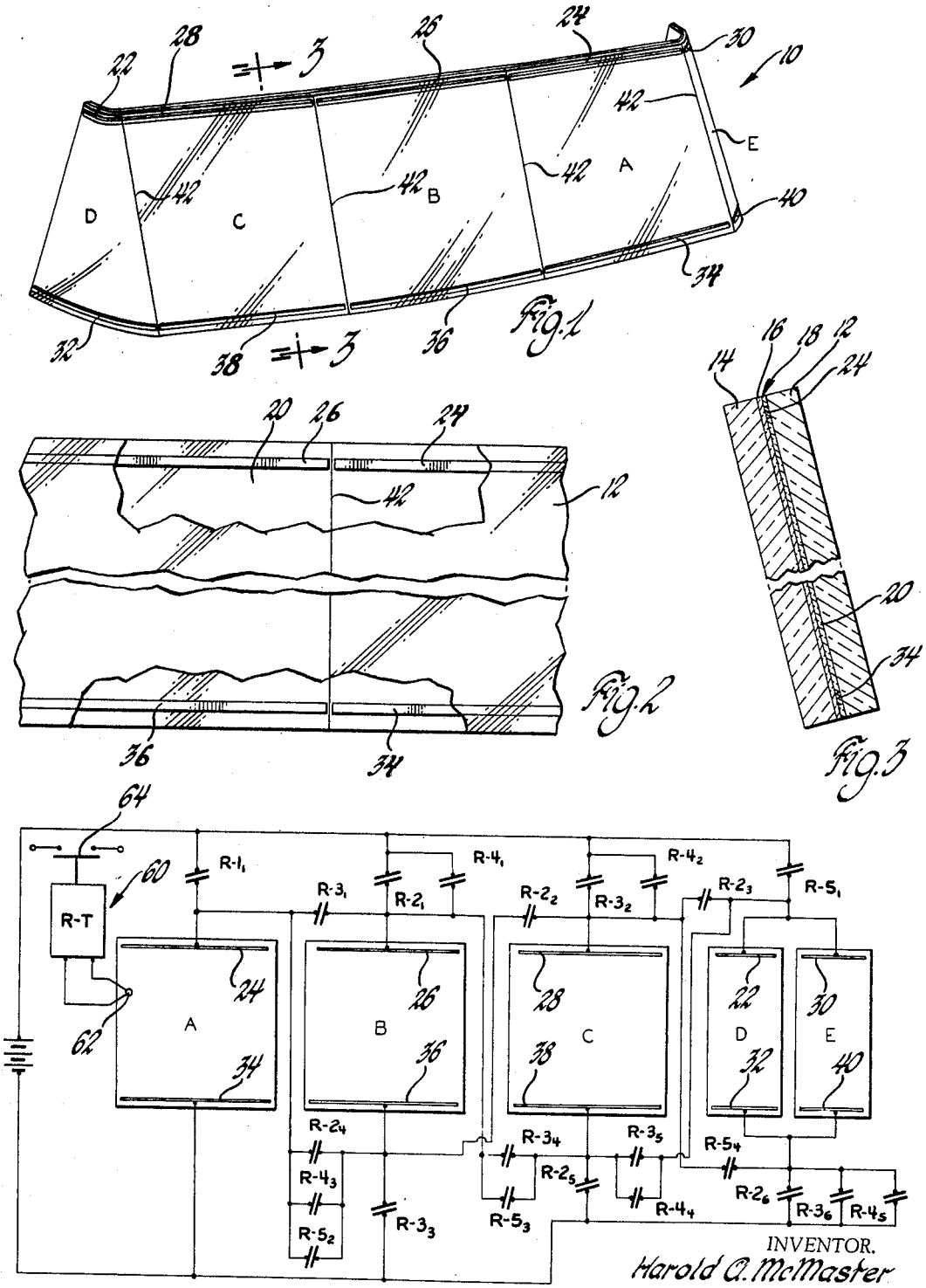

Oct. 28, 1969  H. A. McMASTER  3,475,588
DEFROSTING AND DEICING WINDOW ASSEMBLY
Original Filed Feb. 17, 1967  2 Sheets-Sheet 2
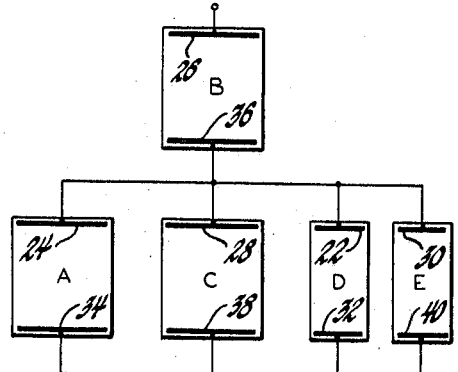
Fig. 5
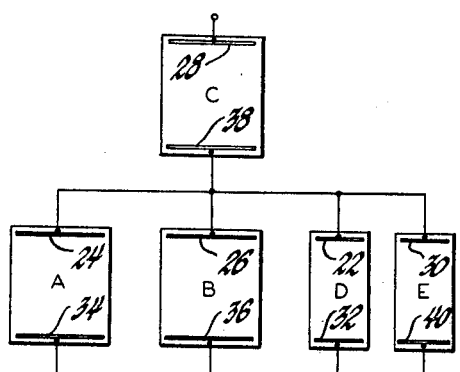
Fig. 6
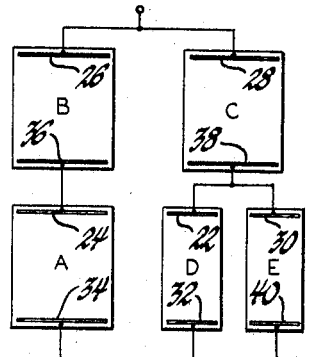
Fig. 7
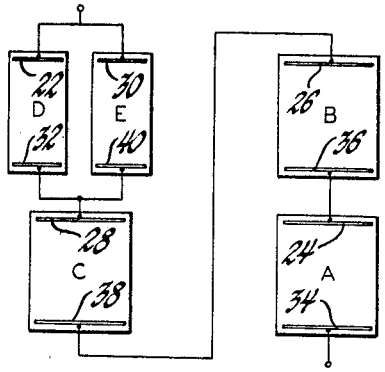
Fig. 8
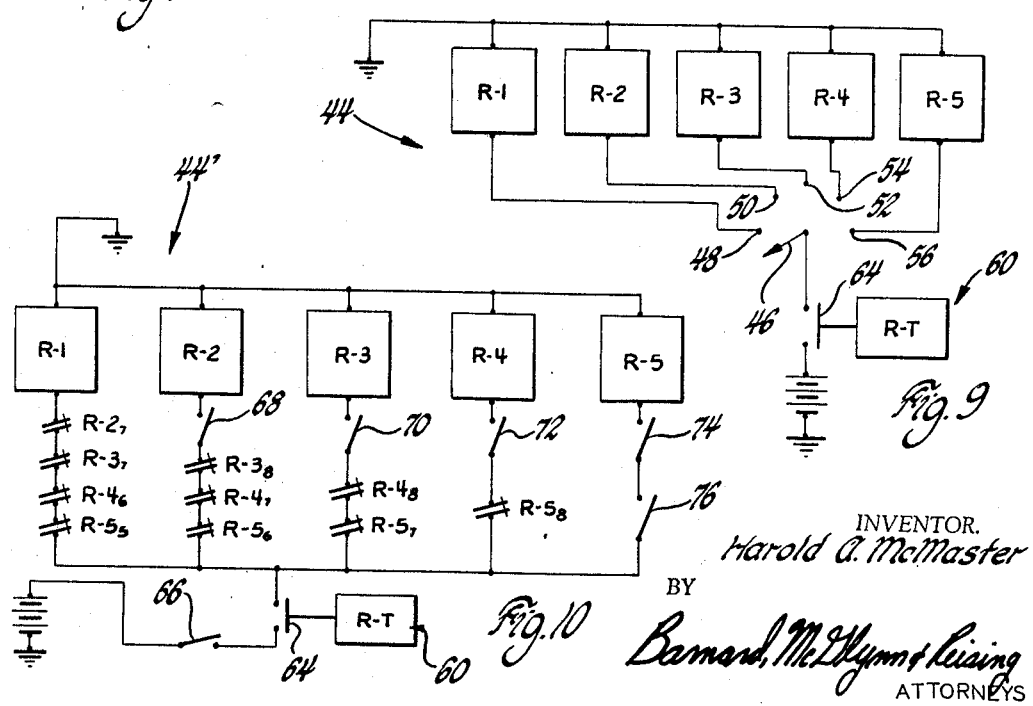
Fig. 9
Fig. 10
INVENTOR.
Harold A. McMaster
BY
Barnard, McLlynn & Rising
ATTORNEYS

United States Patent Office 3,475,588
Patented Oct. 28, 1969

3,475,588
DEFROSTING AND DEICING WINDOW ASSEMBLY
Harold A. McMaster, Woodville, Ohio, assignor to Permaglass, Inc., Woodville, Ohio, a corporation of Ohio
Continuation of application Ser. No. 616,914, Feb. 17, 1967. This application Aug. 20, 1968, Ser. No. 757,521
Int. Cl. B60l 1/02; H05b 3/02, 3/06
U.S. Cl. 219—203      23 Claims

ABSTRACT OF THE DISCLOSURE

Deicing and defrosting window assembly including a transparent window having two layers of tempered glass and an electrically conductive coating between said layers providing a plurality of conductive areas, each of which provides a current path, and sequencing means for programming the application of electrical potential to the conductive areas to successively heat the areas to a desired level and for thereafter applying substantially equal amounts of electrical potential to the areas for substantially evenly heating the areas.

---

This application is a continuation of application Ser. No. 616,914 filed Feb. 17, 1967, now abandoned.

This invention relates to a defrosting and deicing window assembly and, more specifically, to an assembly including a window and an electrically conductive means associated with the window and which provides a plurality of electrical current paths thereby providing a plurality of conducting areas and sequencing means for programming the application of electrical potential to the plurality of areas so that the areas are sequentially and respectively subjected to a greater electrical power than other areas.

The instant invention has particular utility when used as a windshield in automobiles, airplanes, and the like. The prominent method of defrosting and deicing the windshield in an automobile is to apply heated air to the inside of the windshield to thereby defrost the windshield and/or melt the ice thereon. In such systems, the supply of heated air is generally equally divided over substantially the entire area of the windshield. Thus, the entire area of the windshield is defrosted and/or deiced at substantially the same rate and at the same time.

It is, however, desirable in most instances to rapidly defrost and/or deice the area of the windshield immediately in front of the vehicle operator, i.e., defrost and/or deice the area of the windshield in front of the operator before the other areas are defrosted and/or deiced. A device known in the prior art which may be utilized to defrost and/or deice the area of the windshield in front of the operator before the remainder of the windshield is defrosted and/or deiced, comprises a transparent member secured to the area of the windshield in front of the operator and includes electrical heating means for heating the windshield. Such devices must be manufactured separately from the windshield and later secured thereto and frequently obstruct the operator's vision. Furthermore, the electrical power available in most vehicles, such as automobiles, is limited and therefore if such a device is utilized over the entire area of the windshield, the limited power is applied evenly thereto, thus decreasing the rate of defrosting and/or deicing in the area of the windshield in front of the driver since the entire windshield defrosts and/or deices at the same rate.

Accordingly, it is an object and feature of this invention to provide a window having an electrically conductive means to provide a plurality of conductive areas on the window with sequencing means for programming the application of electrical potential to the plurality of areas so that the area of the windshield in front of the operator is subjected to greater electrical power per unit of area than the other areas and the other areas are sequentially each respectively subjected to a greater power per unit area than the others until all of the areas of the windshield have been defrosted and/or deiced, thus providing a system where a limited low electrical power may be utilized to defrost and/or deice an entire windshield yet, by sequentially defrosting and/or deicing the windshield, the area of the windshield immediately in front of the driver is rapidly defrosted and/or deiced before the remaining areas of the windshield.

In general, these and other objects and features of this invention may be attained in a preferred embodiment of the invention which includes first and second layers of tempered glass with an electrically conductive coating disposed on the surface of one of the layers of glass and a transparent layer disposed between the respective layers of glass. There is also included a plurality of current supplying bus bars disposed in end-to-end relationship along one extremity of the window and a plurality of current receiving bus bars disposed in end-to-end relationship along an opposite extremity of the window. Each of the current supplying bus bars is paired and in spaced relationship with one of the current receiving bus bars so that the electrical current path from one of the current supplying bus bars is to its paired current receiving bus bar, each such pair of bus bars defining a conductive area in the conductive coating. In the embodiment of the invention illustrated, the window preferably takes the form of a windshield of the type utilized in automobiles. In such a windshield, there is included five current supplying bus bars disposed along the top of the windshield and five current receiving bus bars disposed along the bottom of the windshield thereby to define five conductive areas. Three of the conductive areas, one of which is the area of the windshield to be disposed in front of the operator of the automobile, are in the central portion of the windshield and are equal to one another. The other two areas are at the ends or sides of the windshield and are each approximately one-half the area of each of the conductive areas in the central portion of the windshield. There is also included a sequencing means which programs the application of electrical potential to the five areas so that the area of the windshield in front of the operator of the vehicle is supplied a greater electrical power than the remaining areas until it has defrosted and/or deiced, after which the greater electrical power is supplied to the area of the windshield in the central portion with the remaining areas having a lesser electrical power supplied thereto and so on until each of the conductive areas is defrosted and/or deiced.

Other objects and attendant advantages of the present invention will be readily appreciated as the same becomes better understood by reference to the following detailed description when considered in connection with the accompanying drawings wherein:

FIGURE 1 is a perspective view of a windshield of the type utilized in an automobile which incorporates the objects and features of the instant invention;

FIGURE 2 is an enlarged fragmentary view partially broken away of the windshield illustrated in FIGURE 1;

FIGURE 3 is an enlarged fragmentary cross-sectional view taken substantially along line 3—3 of FIGURE 1;

FIGURE 4 is a schematic view showing a portion of the sequencing means which may be utilized in the instant invention;

FIGURE 5 is an electrical schematic illustrating the electrical connection between the conductive areas of the window of the instant invention in a second mode;

FIGURE 6 is an electrical schematic illustrating the electrical connection between the conductive areas of the window of the instant invention in a third mode;

FIGURE 7 is an electrical schematic illustrating the electrical connection between the conductive areas of the window of the instant invention in a fourth mode;

FIGURE 8 is an electrical schematic illustrating the electrical connection between the conductive areas of the window of the instant invention in a fifth mode;

FIGURE 9 is an electrical schematic illustrating a first embodiment of a switching means included in the sequenching means of the instant invention; and FIGURE 10 is an electrical schematic illustrating a second embodiment of a switching means included in the sequenching means of the instant invention.

Referring now to the drawings, wherein like numerals indicate like or corresponding parts throughout the several views, a preferred embodiment of the window assembly of the instant invention is generally illustrated at 10 as a windshield of the type suitable for use in an automobile. The window assembly 10 includes a first layer of tempered glass 12 and a second layer of tempered glass 14. A layer of transparent laminating material 16 of the well-known type is disposed between the layers of glass 12 and 14. There is also included an electrically conductive means, generally indicated at 18, associated with the window for providing heat by resistance to electric current passing therethrough. The electrically conductive means 18 provides a plurality of current paths and thereby provides a plurality of conductive areas A, B, C, D and E respectively. More specifically, the conductive means 18 includes an electrically conductive coating 20 which is transparent and is preferably tin oxide. The conductive means 18 also includes a plurality of current supplying means comprising bus bars, which are the first, second, third, fourth and fifth bus bars 22, 24, 26, 28 and 30 respectively, and a plurality of current receiving means comprising bus bars, which are the sixth, seventh, eighth, ninth and tenth bus bars 32, 34, 36, 38 and 40 respectively. The current supplying bus bars 22, 24, 26, 28 and 30 are disposed in end-to-end spaced relationship with one another and in electrical conducting engagement therealong with the coating 20. Likewise, the current receiving bus bars 32, 34, 36, 38 and 40 are disposed in end-to-end spaced relationship with one another and in electrical conducting engagement therealong with the coating 20. Each of the current supplying bus bars 22, 24, 26, 28 and 30 is paired and disposed in spaced relationship with one of the current receiving bus bars 32, 34, 36, 38 and 40 so that the path for electrical current to flow from each current supplying bus bar is to its paired and spaced current receiving bus bar. The bus bars are adjacent opposite extremities of the conductive areas and in electrical conductive engagement along the extremities of each conductive area. Therefore, the path of current flow between paired bus bars defines the respective conductive areas A, B, C, D and E. That is to say, when electrical current is supplied by the bus bar 24, the path of least resistance is for the current to flow to its paired current receiving bus bar 34, the same being true of paired bus bars 22 and 32, paired bus bars 26 and 36, paired bus bars 28 and 38, and paired bus bars 30 and 40. The conductive areas A, B, C, D and E are defined by separating the coating by narrow linear areas which are devoid of coating, such areas being indicated at 42. Hence, the conductive coating is divided into first, second, third, fourth and fifth conductive areas D, A, B, C and E respectively.

here is also included a sequencing means, an embodiment of which is shown in FIGURES 4 and 9 with an alternative embodiment being shown in FIGURES 4 and 10. The sequencing means programs the application of electrical potential ot the plurality of conductive areas A, B, C, D and E so that at least certain ones of the conductive areas are sequentially and respectively subjected to a greater electrical power than the other areas. The sequencing means includes a switching means, one embodiment being shown generally at 44 in FIGURE 9 and another embodiment being shown generally at 44' in FIGURE 10, for sequentially and respectively supply electrical potential to the current supplying bus bars 22, 24, 26, 28 and 30 respectively. The conductive area A is the area of the windshield in front of the vehicle operator. In a first mode, the entire electrical potential from the source is supplied to the bus bar 24 so that current flows through the conductive area A to the current receiving bus bar 34 until the area of the windshield defined by the conductive area A is defrosted and/or deiced, at which time the circuit is sequenced into the next or second mode either automatically or manually depending upon which of the switching means 44 or 44' is utilized. As an example, assume an available potential of 115 volts and that each of the conductive areas A, B and C have a resistance of 15 ohms each, with conductive areas D and E each having a resistance of 30 ohms each, 30 ohms in each of the D and E conductive areas because they each have approximately one half the conductive area as the other conductive areas A, B and C, and therefore provide twice the resistance. In the first mode $$P=E^2/R$$

and therefore the power dissipated in the conductive area A in the first mode is:

$$P=(115)^2/15=881.6 \text{ watts}$$

The second mode is illustrated in FIGURE 5 and discloses that the sequencing means supplies electrical potential to the first, second, third, fourth and fifth bus bars 22, 24, 26, 28 and 30 so that the first and fifth conductive areas D and E are in parallel with one another and in parallel with the second and fourth conductive areas A and C, all of which are as a group in series with the third conductive area B. Thus, in the second mode illustrated in FIGURE 5, the conductive area A has already been defrosted and/or deiced and the greatest power is being applied to the conductive area B so that it will be rapidly defrosted and/or deiced. Using the example values for the potential and resistances set forth above, the effective resistance of conductive areas A, C, D and E in the second mode is $$\frac{1}{R_E}=\frac{1}{R_A}+\frac{1}{R_C}+\frac{1}{R_D}+\frac{1}{R_E}$$

$$\frac{1}{R_E}=\frac{1}{15}+\frac{1}{15}+\frac{1}{30}+\frac{1}{30}=\frac{6}{30}$$

$$R_E=5 \text{ ohms}$$

therefore the total resistance of all the conductive areas in the second mode is $$R_T=R_E+R_B=5+15=20 \text{ ohms}$$

The total power dissipated in the second mode is therefore $$P_T=\frac{E^2}{R_T}=\frac{(115)^2}{20}=661 \text{ watts}$$

The total current flowing in the second mode, which is the same as the current flowing through conductive area B, is $$I_T=\frac{E}{R_T}=\frac{115}{20}=5.75 \text{ amps}$$

Therefore, the power dissipated in conductive area B in the second mode is $$P_B=I^2R_B=(5.75)^215=496 \text{ watts}$$

and the power dissipated in conductive areas A, C, D and E is $$P=I^2R_E=(5.75)^25=165 \text{ watts}$$

with 55 watts being dissipated in each of conductive areas A and C and 27.5 watts being dissipated in each of conductive areas D and E, all of which add up to 661 watts.

After the conductive area B is defrosted and/or deiced, the sequencing means moves to the third mode which is illustrated in FIGURE 6. In the third mode, the sequencing means supplies electrical potential to the first, second, third, fourth and fifth bus bars 22, 24, 26, 28 and 30 so that the first and fifth conductive areas D and E are in parallel with one another and in parallel with the second and third conductive areas A and B, all of which are as a group in series with the fourth conductive area C. Thus, in the third mode illustrated in FIGURE 6, the conductive area C dissipates a greater electrical power than the remaining areas so that it is rapidly defrosted and/or deiced. The third mode differs from the second mode by the reversal of the positions of conductive areas B and C in the circuit; hence, using the same example figures, conductive area C in the third mode dissipates 496 watts and conductive areas A and B dissipates 55 watts each, with conductive areas D and E each dissipating 27.5 watts each.

Once the conductive area C is defrosted and/or deiced, the sequencing means moves to the fourth mode which is illustrated in FIGURE 7. In the fourth mode as illustrated in FIGURE 7, the sequencing means supplies electrical potential to the first, second, third, fourth and fifth bus bars 22, 24, 26, 28 and 30 so that the first and fifth conductive areas D and E are in parallel with one another and in series with one of the second, third and fourth conductive areas A, B or C (in the embodiment illustrated, area C), with the other two of the second, third and fourth conductive areas A, B, C or D (in the embodiment illustrated, areas A and B) being in series with one another and in parallel with the group comprising the first and fifth conductive areas D and E and the conductive area B, which is in series therewith. That is to say, in the mode illustrated in FIGURE 7, the second, third and fourth conductive areas A, B, and C may be interchanged. Prior to entering the fourth mode, illustrated in FIGURE 7, the conductive areas A, B and C have been defrosted and/or deiced and in the fourth mode the conductive areas D and E are being completely defrosted and/or deiced. In the fourth mode the resistance of conductive areas B and A is 30 ohms, the effective resistance of conductive areas D and E, which are in parallel, is 15 ohms, and the resistance of conductive areas C, D and E is 30 ohms. Thus, the total resistance of all the conductive areas in the fourth mode is $$\frac{1}{R_T} = \frac{1}{R} + \frac{1}{R} = \frac{1}{30} + \frac{1}{30} = \frac{2}{30}$$

$R_T = 15$ ohms

The total power dissipated in the fourth mode is $$P_T = \frac{E^2}{R_T} = \frac{(115)^2}{15} = 882 \text{ watts}$$

Thus, the power dissipated in each of conductive areas A, B and C is 220.5 watts, and the power dissipated in each of the conductive areas D and E is 110.25 watts.

Once the first and fifth conductive areas D and E have been completely defrosted and/or deiced, the sequencing means switches to the fifth mode which is illustrated in FIGURE 8. In the fifth mode as illustrated in FIGURE 8, the sequencing means supplies electrical potential to the first, second, third, fourth and fifth bus bars 22, 24, 26, 28 and 30 so that conductive areas D and E are in parallel with one another and in series with the other conductive areas A, B, and C. In the mode illustrated in FIGURE 8, electrical potential is applied to the respective conductive areas so as to maintain the entire windshield defrosted and/or deiced. In the fifth mode, the effective resistance of conductive areas D and E is 15 ohms and the total resistance of all the conductive areas is 60 ohms. Thus, the total power dissipated in the fifth mode is $$P_T = \frac{E^2}{R_T} = \frac{(115)^2}{60} = 220.4 \text{ watts}$$

with 55.1 watts being dissipated in each of the conductive areas A, B and C, and 27.55 watts being dissipated in each of the conductive areas D and E.

As mentioned above, the sequencing means may include a manually actuated switching means 44 and/or an automatic switching means 44'. The manually actuated switching means 44 includes a manually actuated multi-position switch 46 which selectively supplies electrical current to one of the relays R-1, R-2, R-3, R-4 or R-5. In a like manner, the automatic switching means 44' supplies electrical current to one of the relays R-1, R-2, R-3, R-4 or R-5. The relays each have a plurality of contacts which are utilized to establish the modes as described above and illustrated in FIGURES 5 through 8.

Before describing the alternative embodiments of the switching means 44 and 44', the sequencing circuitry of FIGURE 4 will be described. When the relay R-1 is energized, its relay contacts R-1₁ are closed to thus supply electrical potential to the bus bar 24 so that current flows through the conductive area A and to the current receiving bus bar 34, this being the first mode which is not specifically illustrated. Once the conductive area A is defrosted and/or deiced, the second mode which is illustrated in FIGURE 5 is established by de-energizer relay R-1 and energizing relay R-2. Upon energizing relay R-2, the relay contacts R-2₁, R-2₃, R-2₄, R-2₅ and R-2₆, as illustrated in FIGURE 4, are closed so that the first and fifth conductive areas D and E are in parallel with one another and in parallel with the second and third conductive areas A and C, all of which are as a group in series with the third conductive area B.

Once the conductive area B is defrosted and/or deiced, the relay R-2 is de-energized and relay R-3 is energized to establish the third mode which is illustrated in FIGURE 6. When the relay R-3 is energized, its relay contacts R-3₁, R-3₂, R-3₄, R-3₅ and R-3₆, as illustrated in FIGURE 4, are closed so that the first and fifth conductive areas D and E are in parallel with one another and in parallel with the second and third conductive areas A and B, all of which are as a group in series with the fourth conductive area C.

Once the conductive area C is defrosted and/or deiced the relay R-3 is de-energized and the relay R-4 is energized, thus establishing the fourth mode illustrated in FIGURE 7. When the relay R-4 is energized, its contacts R-4₁, R-4₂, R-4₃, R-4₄ and R-5₅ are closed so that the first and fifth conductive areas D and E are in parallel with one another and in series with the third conductive area B and the other two of the conductive areas A and C are in series with one another and in parallel with the group comprising the first, fifth and third conductive areas D, E and B respectively.

Once the conductive areas D and E have been completely defrosted and/or deiced, the relay R-4 is de-energized and the relay R-5 is energized to establish the fifth mode which is illustrated in FIGURE 8. When the relay R-5 is energized, its relay contacts R-5₁, R-5₂, R-5₃ and R-5₄ are closed so that the first and fifth conductive areas D and E are in parallel with one another and in series with the second, third and fourth conductive areas A, B and C.

The sequencing means also includes a control means generally indicated at 60, which is responsive to the temperature in at least one of the conductive areas (conductive area A being illustrated) for controlling the supply of electrical potential when the conductive area reaches a predetermined temperature. More specifically, the control means 60 includes a temperature sensing element 62 and a relay R-T. Although only one temperature sensing element 62 is shown, a similar such temperature sensing element may be disposed in each of the respective conductive areas. When the temperature in the conductive areas, such as conductive area A as illustrated, reaches a temperature which is too high, the temperature sensing element 62 energizes the relay R-2 which in turn opens the switch 64, thus preventing electrical potential from being supplied to any of the conductive areas. Although the switch 64 is illustrated as being disposed in the line supplying current to the relays, it can also be disposed in the line shown in FIGURE 4 which supplies current to the conductive areas. In addition, the relay R–T may control two such switches, one in each current supplying line.

The manual switching means 44 is activated by moving the selector switch 46 from the off position illustrated to the first position 48 to energize relay R–1, which establishes the first mode. Thereafter, the selector switch 46 is moved to the second position 50 to energize the relay R–2, which in turn establishes the second mode illustrated in FIGURE 5. The selector switch 46 is then moved to the third position 52 to energize the relay R–3 which in turn establishes the third mode illustrated in FIGURE 6. Subsequently, the selector switch 46 is moved to the fourth position 54 to energize the relay R–4, which in turn establishes the fourth mode illustrated in FIGURE 7. Finally, the selector switch 46 is moved to the fifth position 56 to energize the relay R–5, which in turn establishes the fifth mode illustrated in FIGURE 8.

The automatic switching means 44' is activated by closing the manual off-on switch 66. The automatic switching means 44' includes temperature sensing elements 68, 70, 72, 74 and 76 respectively. Although not illustrated in FIGURE 4, the temperature sensing element 68 is disposed in the second conductive area A, the temperature sensing element 70 is disposed in the third conductive area B, the temperature sensing element 72 is disposed in the fourth conductive area C, the temperature sensing element 74 is disposed in the first conductive area D, and the temperature sensing element 76 is disposed in the fifth conductive area E.

Once the manual switch 66 is closed, current flows through the normally closed switch 64 and the normally closed relay contacts R–$2_7$, R–$3_7$, R–$4_6$ and R–$5_5$ to energize relay R–1. As set forth above, the energization of relay R–1 supplies an electrical potential to the conductive area A, i.e., the first mode.

Once the conductive area A has reached a predetermined temperature, the temperature sensing element 68 closes to allow current to energize the relay R–2. When the relay R–2 is energized its normally closed contacts R–$2_7$ open, thus de-energizing relay R–1. As set forth above, the second mode as illustrated in FIGURE 5 is established once the relay R–2 is energized.

When the conductive area B has reached a predetermined temperature, the temperature sensing element 70 closes allowing current to energize the relay R–3. Once relay R–3 is energized, its normally closed contacts R–$3_7$ and R–$3_8$ are opened to de-energize relay R–2 and to prevent current from flowing to relay R–1. As explained above, when the relay R–3 is energized, the third mode as illustrated in FIGURE 6 is established.

Once the conductive area C has reached a predetermined temperature, the temperature sensing element 72 closes to energize relay R–4. When relay R–4 is energized, its normally closed contacts R–$4_6$, R–$4_7$ and R–$4_8$ are opened to de-energize relay R–3 and to prevent relays R–1 and R–2 from becoming energized. As explained above, when relay R–4 is energized, the fourth mode as illustrated in FIGURE 7 is established.

When the temperature in conductive areas D and E has reached a predetermined point, the temperature sensing elements 74 and 76 close to energize relay R–5. Once relay R–5 is energized, its normally closed contacts R–$5_5$, R–$5_6$, R–$5_7$ and R–$5_8$ are opened to de-energize relay R–4 and to prevent relays R–1, R–2 and R–3 from becoming energized. As explained above, once relay R–5 is energized, the fifth mode as illustrated in FIGURE 8 is maintained.

If while the system is in the fifth mode illustrated in FIGURE 8, the temperature exceeds a predetermined upper limit, the sensing means 62 will close to actuate the relay R–T which in turn opens the switch 64 to prevent electrical current from being supplied to any of the relays which in turn prevents electrical power from being supplied to any of the conductive areas. Once the temperature has lowered sufficiently, the temperature sensing element 62 will again open, closing the switch 64 to again sequence the relays which in turn allows current to flow to the respective conductive areas.

It will be understood that various devices other than the specific means disclosed herein may be utilized to sequence the heating of the respective areas.

The invention has been described in an illustrative manner and it is to be understood that the terminology which has been used is intended to be in the nature of words of description rather than of limitation.

Obviously, many modifications and variations of the present invention are possible in light of the above teachings. It is, therefore, to be understood that within the scope of the appended claims, the invention may be practiced otherwise than as specifically described.

The embodiments of the invention in which an exclusive property or privilege is claimed are defined as follows:

1. A window assembly comprising: a transparent window, a transparent electrically conductive means connected to said window for providing heat as electric current is passed therethrough, said electrically conductive means providing a plurality of conductive areas each of which provides a current path, each of said conductive areas including a current supplying means and a current receiving means on opposite extremities thereof and in electrical conductive engagement along the extremities of each of said conductive areas, and sequencing means for automatically programming the application of electrical potential to said plurality of areas so that at least certain ones of said areas are sequentially and respectively subjected to a greater electrical power than the other areas to successively heat said areas to a desired level and for thereafter subjecting said areas to substantially equal amounts of electrical power to substantially evenly heat said areas.

2. A window assembly as set forth in claim 1 wherein said window is tempered glass and said conductive means includes an electrically conductive coating.

3. A window assembly as set forth in claim 2 wherein said window includes a first layer of tempered glass and a second layer of tempered glass, said coating being disposed adjacent the surface of one of said layers and between said layers.

4. A window assembly as set forth in claim 1 wherein said conductive means comprises an electrically conductive coating of tin oxide.

5. A window assembly as set forth in claim 1 wherein said conductive means includes an electrically conductive coating divided into said plurality of areas by narrow linear areas without said coating thereon.

6. A window assembly as set forth in claim 1 wherein said electrically conductive means includes an electrically conductive coating, and said current supplying means includes a plurality of current supplying bus bars disposed in end-to-end spaced relationship with one another and in electrical conducting engagement therealong with said coating, and said current receiving means includes a plurality of current receiving bus bars disposed in end-to-end spaced relationship with one another and in electrical conducting engagement therealong with said coating, each of said current supplying bus bars being paired and disposed in spaced relationship with one of said current receiving bus bars so that the electrical current path from each current supplying bus bar is to its paired and spaced current receiving bus bar and whereby the path of current flow between each pair of bus bars defines one of said conductive areas.

7. A window assembly as set forth in claim 6 wherein said sequencing means includes a control means responsive to the temperature in at least one of said conductive areas for controlling the supply of electrical potential when said conductive area reaches a predetermined temperature.

8. A window assembly comprising: a transparent window, a transparent electrically conductive coating for providing heat as electric current is passed therethrough, a plurality of current supplying bus bars disposed in end-to-end spaced relationship with one another and in electrical conducting engagement therealong with said coating, a plurality of current receiving bus bars disposed in end-to-end spaced relationship with one another and in electrical conducting engagement therealong with said coating, each of said current supplying bus bars being paired and disposed in spaced relationship with one of said current receiving bus bars so that the electrical current path from each current supplying bus bar is to its paired and spaced current receiving bus bar whereby the path of current flow between each pair of bus bars defines a conductive area, said current supplying bus bars include first, second, third, fourth and fifth bus bars and said current receiving bus bars include sixth, seventh, eighth, ninth and tenth bus bars, said first bus bar being paired with said sixth bus bar to define a first conductive area, said second bus bar being paired with said seventh bus bar to define a second conductive area, said third bus bar being paired with said eighth bus bar to define a third conductive area, said fourth bus bar being paired with said ninth bus bar to define a fourth conductive area, said fifth bus bar being paired with said tenth bus bar to define a fifth conductive area, said second, third and fourth conductive areas being substantially equal to one another, each of said first and fifth conductive areas being substantially one-half the area of any one of said second, third and fourth conductive areas, and sequencing means including switching means for sequentially and respectively supplying electrical potential to said second bus bar; then supplying electrical potential to said first, second, third, fourth and fifth bus bars so that said first and fifth conductive areas are in parallel with one another and in parallel with said second and fourth conductive areas, all of which are as a group in series with said third conductive area; then supplying electrical potential to said first, second, third, fourth and fifth bus bars so that said first and fifth conductive areas are in parallel with one another and in parallel with said second and third conductive areas, all of which are as a group in series with said fourth conductive area; then supplying electrical potential to said first, second, third, fourth and fifth bus bars so that said first and fifth conductive areas are in parallel with one another and in series with one of said second, third and fourth conductive areas, with the other two of said second, third and fourth conductive areas being in series with one another and in parallel with the group comprising said first and fifth conductive areas and the conductive area in series therewith; and then supplying electrical potential to said first, second, third, fourth and fifth bus bars so that said first and fifth conductive areas are in parallel with one another and said second, third and fourth conductive areas are in series with one another and in series with said first and fifth conductive areas.

9. A window assembly as set forth in claim 8 wherein said sequencing means includes automatic switching means and temperature sensing means in contact with at least some of said conductive areas for sequencing said supply of electrical potential as each respective conductive area reaches a predetermined temperature.

10. A window assembly as set forth in claim 8 wherein said sequencing means includes manually actuated switching means comprising a manually actuated multi-position switch for sequencing said supply of electrical potential.

11. A window assembly as set forth in claim 8 wherein said sequencing means includes a control means responsive to the temperature in at least one of said conductive areas for controlling the supply of electrical potential when said conductive area reaches a predetermined temperature.

12. A window assembly as set forth in claim 8 wherein said window includes a first layer of tempered glass and a second layer of tempered glass, said coating being disposed adjacent the surface of one of said layers and between said layers.

13. A window assembly as set forth in claim 12 wherein said coating is of tin oxide.

14. A window assembly as set forth in claim 12 wherein said coating is divided into said plurality of areas by narrow linear areas without said coating thereon.

15. A window assembly comprising: a transparent window, transparent electrically conductive means adjacent said window for providing heat as electric current is passed therethrough, said electrically conductive means providing a plurality of conductive areas each of which provides a current path, each of said conductive areas including a current supplying means and a current receiving means on opposite extremities thereof and in electrical conductive engagement along the extremities of each of said conductive areas, and sequencing means for automatically controlling the application of electrical potential to said current supplying means so that at least certain ones of said areas are sequentially and respectively subjected to a greater electrical power per unit of area than the other areas to successively heat said areas to a certain degree and for thereafter subjecting said areas to substantially equal amounts of electrical power per unit area.

16. A window assembly as set forth in claim 15 wherein said sequencing means includes temperature sensing means for sequencing said supply of electrical potential as each respective conductive area reaches a predetermined temperature.

17. A window assembly as set forth in claim 15 wherein said window includes a first layer of glass and a second layer of glass, and said conductive means comprises an electrically conductive coating disposed between said layers of glass.

18. A window assembly comprising; a window, an electrically conductive means adjacent said window for providing heat as electric current is passed therethrough, said electrically conductive means providing at least first and second conductive areas each of which provides a current path, each of said conductive areas including a current supplying means nad a current receiving means on opposite extremities thereof and in electrical conductive engagement along the extremities of each of said conductive areas, and sequencing means for controlling the application of electrical potential to said current supplying means so that the portion of the window adjacent said first area is subjected to more heat per unit area than the portion of the window adjacent said second area during a first mode and is thereafter, during a second mode, subjected to heat which is less per unit area than during said first mode while the portion of the window adjacent said second area is subjected to an increased amount of heat per unit area than during said first mode and is thereafter, during a third mode, subjected to a substantially equal amount of heat per unit area as the portion adjacent said second area.

19. A window assembly as set forth in claim 18 wherein said sequencing means includes automatic switching means and temperatures sensing means in contact with at least some of said conductive areas for sequencing from said first mode to said second mode when said first conductive area reaches a predetermined temperature.

20. A window assembly as set forth in claim 18 wherein said window includes a first layer of glass and a second layer of glass, and said conductive means comprises an electrically conductive coating disposed between said layers of glass.

21. A window assembly comprising; a transparent window; a transparent electrically conductive means adjacent said window for providing heat as electric current is passed therethrough; said electrically conductive means providing first, second and third conductive areas each of which provides a current path; each of said conductive areas including a current supplying means and a current receiving means on opposite extremities thereof and in electrical conductive engagement along the extremities of each of said conductive areas, and sequencing means having first, second and third modes to sequentially apply electrical potential to said current supplying means for dissipating more heat per unit of area in said first area than in said second and third areas during said first mode and dissipating more heat per unit of area in said second area than in said first and third areas during said second mode while continuing to apply electrical potential to said first area and dissipating more heat per unit of area in said third area than in said first and second areas during said third mode while continuing to apply electrical potential to said first and second areas.

22. A window assembly comprising; a transparent window; a transparent electrically conductive means adjacent said window for providing heat as electric current is passed therethrough; said electrically conductive means providing first, second and third conductive areas each of which provides a current path; each of said conductive areas including a current supplying means and a current receiving means on opposite extremities thereof and in electrical conductive engagement along the extremities of each of said conductive areas, and sequencing means having first, second, third, and fourth modes to sequentially apply electrical potential to said current supplying means for dissipating more heat per unit of area in said first conductive area than in said second and third conductive areas during said first mode and dissipating more heat per unit of area in said second conductive area than in said first and third conductive areas during said second mode while continuing to dissipate heat in said first area and dissipating more heat per unit of area in said third conductive area than in said first and second conductive areas during said third mode while continuing to dissipate heat in said first and second areas and dissipating substantially equal amounts of heat per unit of area in all of said conductive areas during said fourth mode.

23. A window assembly as set forth in claim 22 wherein said sequencing means includes automatic switching means and temperature sensing means in contact with said conductive areas for sequencing through said modes as each respective conductive area reaches a predetermined temperature.

References Cited

UNITED STATES PATENTS

| | | | |
|---|---|---|---|
| 2,495,788 | 1/1950 | Trist | 219—543 X |
| 2,557,983 | 6/1951 | Linder | 219—543 |
| 2,806,118 | 9/1957 | Peterson | 219—203 |
| 2,843,713 | 7/1958 | Morgan | 219—543 |
| 2,866,881 | 12/1958 | McMillen | 219—543 X |
| 2,877,329 | 3/1959 | Gaiser | 338—309 |
| 2,954,454 | 9/1960 | Gaiser | 219—203 |
| 3,313,920 | 4/1967 | Gallez | 219—522 |
| 3,379,858 | 4/1968 | Peters | 219—522 |

VOLODYMYR Y. MAYEWSKY, Primary Examiner

U.S. Cl. X.R.

219—486, 522, 543; 244—134